UNITED STATES PATENT OFFICE.

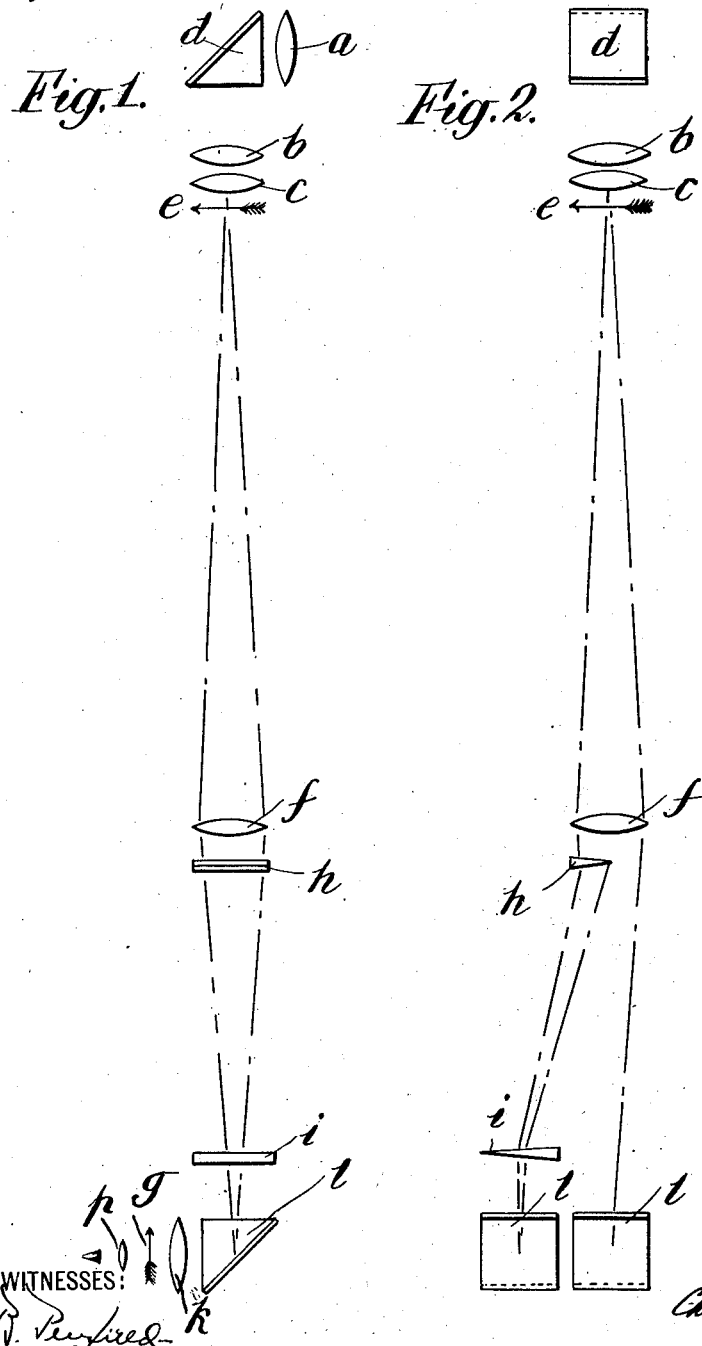

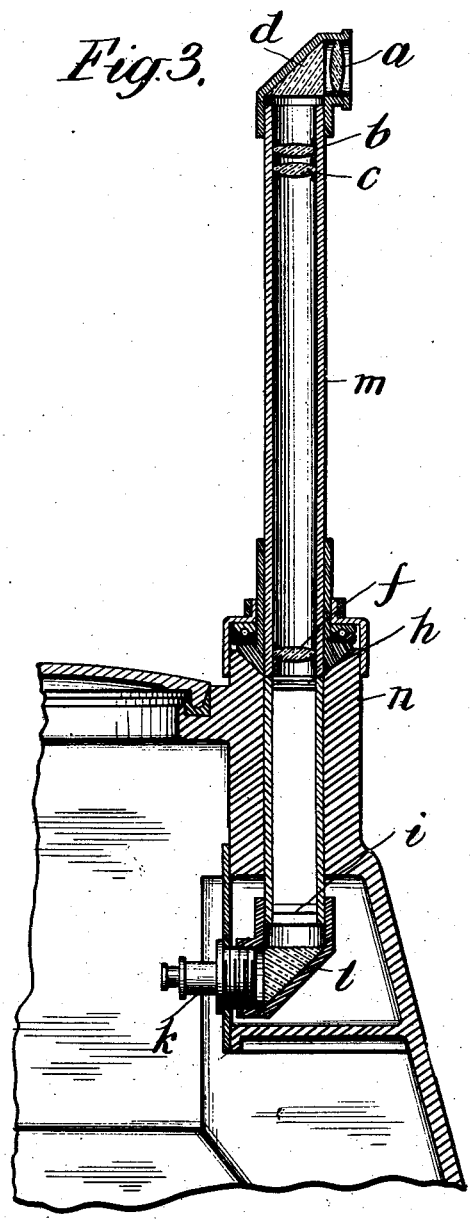
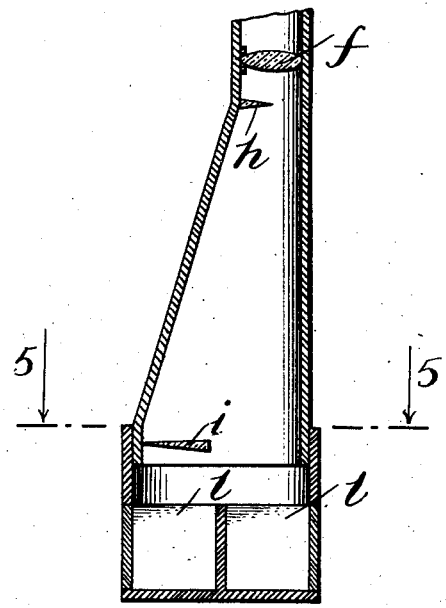
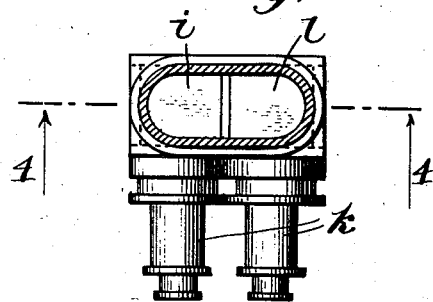

CHARLES H. BEDELL, OF QUINCY, MASSACHUSETTS.

BINOCULAR PERISCOPE.

954,160.  Specification of Letters Patent.  Patented Apr. 5, 1910.

Application filed November 4, 1909. Serial No. 526,270.

*To all whom it may concern:*

Be it known that I, CHARLES H. BEDELL, a citizen of the United States, residing at Quincy, in the county of Norfolk and State of Massachusetts, have invented certain new and useful Improvements in Binocular Periscopes; and I do hereby declare the following to be a full, clear, and exact description of the invention, such as will enable others skilled in the art to which it appertains to make and use the same.

The object of my invention is to provide a practicable binocular periscope for submarine boats and the like, and to this end I have provided a single periscope tube requiring no greater diameter, offering no more resistance to the water than the ordinary monocular periscope tube, and having the ordinary objective system, in combination with a prism within the tube for deflecting a sufficient portion of the rays to form a second image, a second lens or prism for bringing these deflected rays into parallelism with the undeflected rays which form the first image, and a binocular eyepiece for observing the two images.

The principles of the invention, and a preferred practical embodiment of them, will be more fully understood from the following description and the accompanying drawings.

In the drawings, Figures 1 and 2 are diagrams, at right angles to one another, of a convenient arrangement of lenses for carrying out my invention; Fig. 3 is a central vertical section of the tube and its support in the conning tower; Fig. 4 is a detail section on a larger scale on the line 4—4 of Fig. 5, and Fig. 5 is a detail plan on the line 5—5 of Fig. 4.

In Figs. 1 and 2 the lenses $a$, $b$ and $c$ represent the ordinary objective combination, and the total reflecting prism $d$ serves to deflect the rays down the periscope tube, the image being formed at $e$, as indicated by the arrow. After the light passes the focal plane at $e$ it continues down the tube and strikes the projecting lens $f$ which serves as usual to project the light rays to the focal plane at $g$, where a reproduction of the image is formed.

In accordance with my invention a deflecting prism is interposed in the path of the light rays and serves to deflect half of them to one side. In Fig. 2 this prism is shown at $h$ as a separate piece, though in some cases it is desirable to grind it in a single piece with the projecting lens $f$. A second deflecting prism $i$ is placed in the path of the rays deflected by prism $h$ for the purpose of bringing them into parallelism with the undeflected rays, the relative positions of prisms $h$ and $i$, and the angle of deflection, being such that the deflected rays form a separate image at $g$ at one side of the first image and far enough apart therefrom to permit the observation of the two images through the binocular eye-piece represented at $k$. The total reflecting prisms $l$, which may conveniently be made in a single piece if desired, are interposed for the usual purpose of bringing the images in position to be observed through the horizontal eye piece.

From Figs. 3, 4 and 5 it will be seen that the periscope tube $m$ is, at its upper portion, of the usual type, mounted in the usual manner in the front of conning tower $n$, but at its lower end, and within the vessel, the tube is spread out laterally for the reception of deflecting prisms $h$ and $i$, and is provided with the binocular eye-piece $k$.

What I claim is:—

1. A binocular periscope for submarine boats or the like having a single tube and a single objective system of lenses, means within the tube for dividing the rays passing through the objective system and for bringing the two pencils of rays into parallelism and to a focus on the same plane to form two images, and a binocular eye piece for observing the two images; substantially as described.

2. A binocular periscope for submarine boats or the like, having at its upper end an objective system of lenses and a total-reflecting-surface for deflecting the light rays down the periscope tube, in combination with a deflecting prism in the path of the light rays for deflecting a portion thereof, a second deflecting prism for bringing the deflected rays into parallelism with the undeflected rays, total reflecting surfaces for deflecting the two pencils of rays, laterally, and a laterally-extending binocular eye piece for observing the two images so produced; substantially as described.

3. A binocular periscope for submarine boats and the like, having a single tube and having at its upper end an objective system of lenses and a total-reflecting surface for deflecting the light rays down the periscope tube, said tube being enlarged laterally at its lower end, a deflecting prism in the path of the light rays for deflecting a portion thereof into the lateral enlargement, a second deflecting prism in the lateral enlargement for bringing the deflected rays into parallelism with the undeflected rays, total-reflecting surfaces at the bottom of the tube for deflecting the two sets of rays horizontally, and a binocular eye piece attached to the side of the tube near its lower end for observing the images so produced; substantially as described.

In testimony whereof I affix my signature, in presence of two witnesses.

CHARLES H. BEDELL.

Witnesses:
F. L. BRAKE,
W. D. FESLER.